S. SZEMANSKI.
AUTOMOBILE TOP.
APPLICATION FILED APR. 10, 1918.

1,301,619.

Patented Apr. 22, 1919.

Inventor
Stefan Szemanski
By Strong & Townsend
Attorneys ated Apr. 22, 1919.
UNITED STATES PATENT OFFICE.

STEFAN SZEMANSKI, OF SAN FRANCISCO, CALIFORNIA.

AUTOMOBILE-TOP.

1,301,619.　　　　Specification of Letters Patent.　　Patented Apr. 22, 1919.

Application filed April 10, 1918.　Serial No. 227,763.

*To all whom it may concern:*

Be it known that I, STEFAN SZEMANSKI, a citizen of the United States, residing at the city and county of San Francisco and State of California, have invented new and useful Improvements in Automobile-Tops, of which the following is a specification.

This invention relates to an automobile top, and particularly to means for raising and lowering the same.

One of the objects of the present invention is to provide a simple, substantial, lazy tong structure which may be applied to the bows of an automobile top for the purpose of raising and lowering the same. Another object of the invention is to provide means operable by one person for folding or extending two or more lazy tong frames in unison and also to provide an extension on said operating mechanism which may be placed within convenient reach of the driver, so that the top may be raised or lowered by the driver without stepping out of the automobile. Further objects will hereinafter appear.

The invention consists of the parts and the construction and combination of parts as hereinafter more fully described and claimed, having reference to the accompanying drawings, in which—

Figure 1:
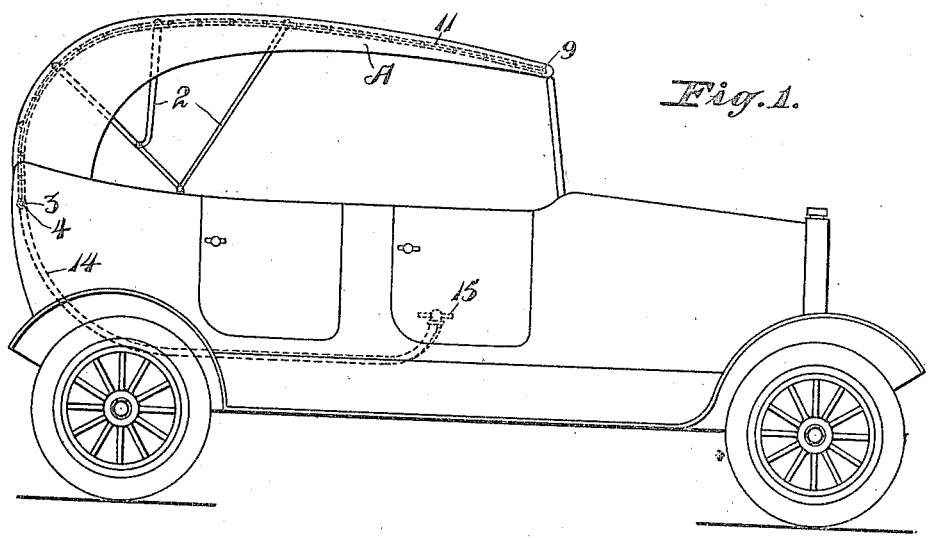
Figure 1 is a side elevation of an automobile, showing the application of the invention.
Figure 2:
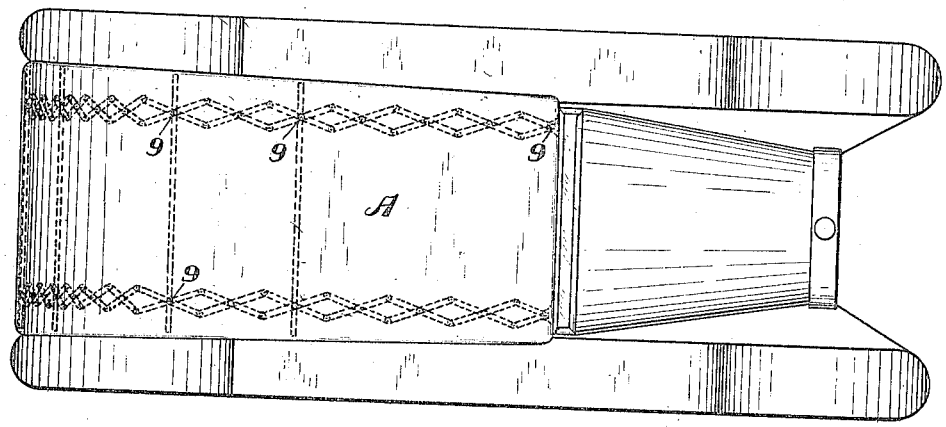
Fig. 2 is a plan view of Fig. 1.
Figure 3:
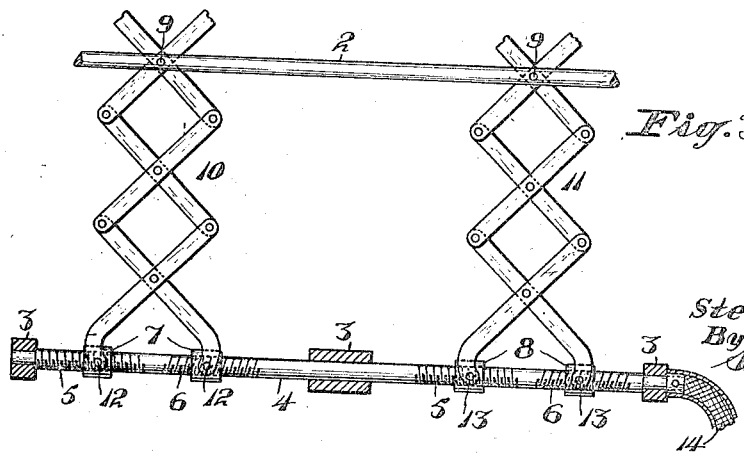
Fig. 3 is a detail view of the screw shaft by which the lazy tong frames are folded or extended.

Referring to the drawings in detail, A indicates, in general, a one-man top and 2 the bows supporting the same. Journaled in bearings 3, in the rear portion of the body of the automobile, is a screw shaft 4 which is right and left-hand threaded, as shown at 5 and 6.

Mounted on the shaft are two pairs of traveling nuts 7 and 8, and attached to the bows of the top, as at 9, are two lazy tong frames 10 and 11. The lower ends of the lazy tong frame 10 is pivotally attached to the traveling nuts 7, as shown at 12, while the lower ends of the frame 11 are pivotally attached, as at 13, to the traveling nuts 8, and as the shaft 4 is right and left-hand threaded, turning movement transmitted to the shaft will cause the nuts 7 and 8 to travel toward or away from each other, the lazy tong frames being extended when the nuts travel toward each other and retracted or folded when the nuts are separated. The end of the shaft 4 may extend through one side of the vehicle body, if desired, and be provided with a square shank to permit the application of a crank, whereby the shaft may be turned when it is desired to raise or lower the top or, as here shown, a flexible shaft 14 may be connected with one end of shaft 4 and extended forwardly to the driver's seat and provided with a turning handle 15. The top may, in this instance, be raised and lowered by the driver directly from the seat by merely turning the handle 15 in one direction or the other, thus making it unnecessary to step outside of the automobile when the top is to be raised or lowered and also making it possible to raise or lower the top while traveling.

The arms forming the lazy tong frames are preferably constructed of spring steel. This permits the lazy tong frames to assume the curvature of the top when extended and to assume a vertical position when the top is lowered.

The device as a whole is so simple that it may be applied and installed in any standard automobile now in use which employs what is termed a one-man top as it is only necessary to insert the shaft 4 and to attach the lazy tong frames at suitable intervals, as at 9, to the bows supporting the top, the lower ends 12 and 13 of the lazy tong frames passing through slots in the rear portion of the vehicle body to permit the lazy tong frames to fold directly into the body when the top is lowered.

The materials and finish of the several parts of the automobile top are such as the experience and judgment of the manufacturer may dictate.

I wish it understood that various changes in the construction and arrangement of the several parts herein shown and described may be employed without departing from the spirit of my invention as disclosed in the appended claims.

Having thus described my invention, what I claim and desire to secure by Letters Patent is—

1. In combination with an automobile top, two lazy-tongs connected thereto, a rotatable element extending transversely of the top and a pair of means for each of the respective lazy-tongs carried by and movable longitudinally of the element and connected to the lazy-tongs whereby upon turning of said element said means and thereby the lazy-tongs will be contracted or expanded according to the direction of rotation of the element.

2. The combination with the body of an automobile, a top therefor and the bows supporting the top, of a right and left-hand threaded screw shaft journaled crosswise in the body of the car, a pair of traveling nuts mounted on the shaft, a lazy tong frame pivotally attached to the forward end of the top and having its opposite end secured to the traveling nuts, said lazy tong frame being also pivotally attached at intermediate points to the bows supporting the top, and means for turning the screw shaft to move the nuts toward or away from each other to fold or extend the lazy tong frame.

3. The combination with the body of an automobile, a top therefor and the bows supporting the top, of a shaft journaled crosswise in the body, said shaft having right and left-hand threads formed thereon, a traveling nut formed on each thread section, a lazy tong frame, said lazy tong frame having its two forward arms pivotally attached at one point to the forward end of the top and having its opposite ends pivotally attached, one to each traveling nut, means for pivotally attaching each bow to the lazy tong frame, and means for turning the shaft in one direction or the other.

4. The combination with the body of an automobile, a top therefor and the bows supporting the top, of a shaft journaled crosswise in the body, said shaft having right and left-hand threads formed thereon, a traveling nut formed on each thread section, a lazy tong frame, said lazy tong frame having its two forward arms pivotally attached at one point to the forward end of the top and having its opposite ends pivotally attached, one to each traveling nut, means for pivotally attaching each bow to the lazy tong frame, means for turning the shaft in one direction or the other, said means comprising a flexible shaft secured to one end of the screw shaft, said flexible shaft being extended to the driver's seat, and a handle on said shaft adjacent to the driver's seat.

5. In combination with an automobile top, two lazy-tongs connected thereto, a pair of means for each of the respective lazy-tongs connected to the lazy-tongs at one end thereof, and means common to each of said pair of means and upon which the latter are mounted to effect relative movement of said means toward and away from one another whereby to contract the lazy-tongs when moved away from one another and to expand the lazy-tongs when moved toward one another.

In testimony whereof I have hereunto set my hand in the presence of two subscribing witnesses.

STEFAN SZEMANSKI.

Witnesses:
 CHARLE KRYST,
 FRANK SZEMANSKI.

Copies of this patent may be obtained for five cents each, by addressing the "Commissioner of Patents, Washington, D. C."